US012259542B2

(12) United States Patent
Smithwick (10) Patent No.: US 12,259,542 B2
(45) Date of Patent: Mar. 25, 2025

(54) OPTICAL VIEWFINDER FOR COSTUME HEADS

(71) Applicant: DISNEY ENTERPRISES, INC., Burbank, CA (US)

(72) Inventor: Quinn Y. Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 12 days.

(21) Appl. No.: 18/102,668

(22) Filed: Jan. 27, 2023

(65) Prior Publication Data

US 2023/0176357 A1 Jun. 8, 2023

Related U.S. Application Data

(62) Division of application No. 16/588,095, filed on Sep. 30, 2019, now Pat. No. 11,592,659.

(51) Int. Cl.
*G02B 23/08* (2006.01)
*A41D 1/00* (2018.01)
*A41G 7/00* (2006.01)
*A63J 7/00* (2006.01)
*G02B 13/00* (2006.01)
*G02B 23/14* (2006.01)
(Continued)

(52) U.S. Cl.
CPC ............... *G02B 23/08* (2013.01); *A41D 1/00* (2013.01); *A41G 7/00* (2013.01); *A63J 7/005* (2013.01); *G02B 13/0095* (2013.01); *G02B 23/14* (2013.01); *G02B 27/0172* (2013.01); *A42B 3/042* (2013.01); *G02B 2027/0145* (2013.01)

(58) Field of Classification Search
CPC ...... G02B 23/08; G02B 23/12; G02B 23/125; G02B 23/14; G02B 27/0172; G02B 2027/0138; G02B 2027/0145; G02B 13/06; G02C 7/086–088; A42B 3/042; A63J 7/005; A41D 1/00; A41G 7/00
See application file for complete search history.

(56) References Cited

U.S. PATENT DOCUMENTS

4,465,347 A * 8/1984 Task .................... G02B 27/0172
359/420
4,563,061 A * 1/1986 Ellis .................... G02B 27/0176
359/364
(Continued)

*Primary Examiner* — Nicholas R. Pasko
(74) *Attorney, Agent, or Firm* — Dorsey & Whitney LLP (57) ABSTRACT

A head for a walk-around costume is provided that is adapted for enhanced visibility. The costume head includes an outer shell defining an interior space for receiving a head of a human performer. The outer shell includes an aperture allowing incoming light from an exterior space to enter the interior space, and an eye location for the human performer is spaced apart from the aperture when the head is received in the interior space. To provide an enlarged field of view, the costume head includes an optical viewfinder assembly disposed within the interior space of the outer shell between the aperture and the eye location. The optical viewfinder assembly is adapted for receiving the incoming light and transmitting the incoming light to the eye location to move a viewpoint of the human performer to the aperture to provide a larger field of view of the exterior space.

20 Claims, 7 Drawing Sheets

(51) Int. Cl.
*G02B 27/01* (2006.01)
*A42B 3/04* (2006.01)

(56) References Cited

U.S. PATENT DOCUMENTS

| | | | |
|---|---|---|---|
| 5,184,231 A * | 2/1993 | Ellis | A42B 3/228 |
| | | | 359/13 |
| 5,229,598 A * | 7/1993 | Flipovich | G02B 23/125 |
| | | | 313/524 |
| 5,416,315 A * | 5/1995 | Flipovich | G02B 23/125 |
| | | | 313/524 |
| 5,640,632 A | 6/1997 | Koyama et al. | |
| 6,867,916 B2 | 3/2005 | Koyama et al. | |
| 2013/0077140 A1 | 3/2013 | Bach | |
| 2017/0299866 A1 | 10/2017 | Smithwick | |
| 2018/0292655 A1 | 10/2018 | Smithwick et al. | |

\* cited by examiner

OPTICAL VIEWFINDER FOR COSTUME HEADS

CROSS REFERENCE TO RELATED APPLICATIONS

This application is a divisional of U.S. patent application Ser. No. 16/588,095, filed Sep. 30, 2019, which is incorporated herein by reference in its entirety.

BACKGROUND

1. Field of the Description

The present description relates, in general, to walk-around costumes used in entertainment settings such as theme and amusement parks, at sporting events, and so on. More particularly, the description relates to an optical viewfinder system or assembly for use in the head of a walk-around costume to enhance the view of the surrounding environment or space to a human ("actor" or "performer") wearing the walk-around costume.

2. Relevant Background

Theme and amusement parks and other entertainment venues such as sports stadiums often entertain visitors by providing characters from movies and other media, fanciful animals and other creatures, and team mascots. These characters are provided by human actors or performers wearing full body or walk-around costumes that often include a head such that the performer's head is enclosed within the costume. Costumed characters in the physical real world need to be the appropriate height and proportions relative to their animated or movie counterparts in their story world.

Visibility for the human performer wearing the costume, e.g., a large head over their own head, is an ongoing challenge to successfully presenting characters through the use of walk around costumes. In many cases, the physical costume's eyes are not conveniently located at the same height or spacing as a human performer's eyes. This makes it difficult for costumed performers to see out of the costumes, which leads to problems with interacting properly with nearby observers. The lack of expected interaction is especially apparent with regard to eye contact between the costumed character and a nearby person and with regard to the costumed character's gaze direction.

Figure 1A:
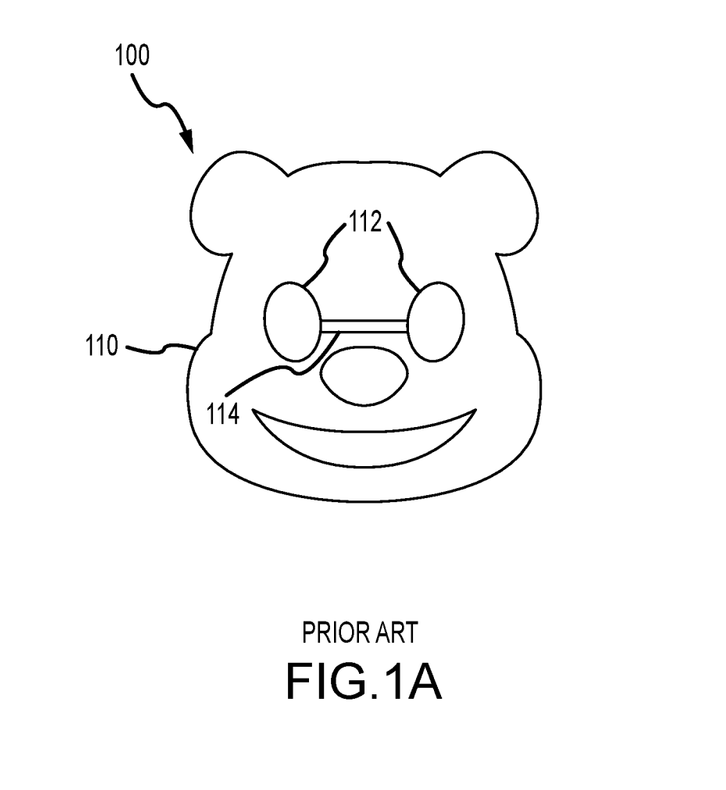
FIGS. 1A and 1B illustrate front and side views of a costume head within conventional viewing of exterior spaces through view ports or a view slit when costume eyes are non-aligned with performer's eyes.
Figure 1B:
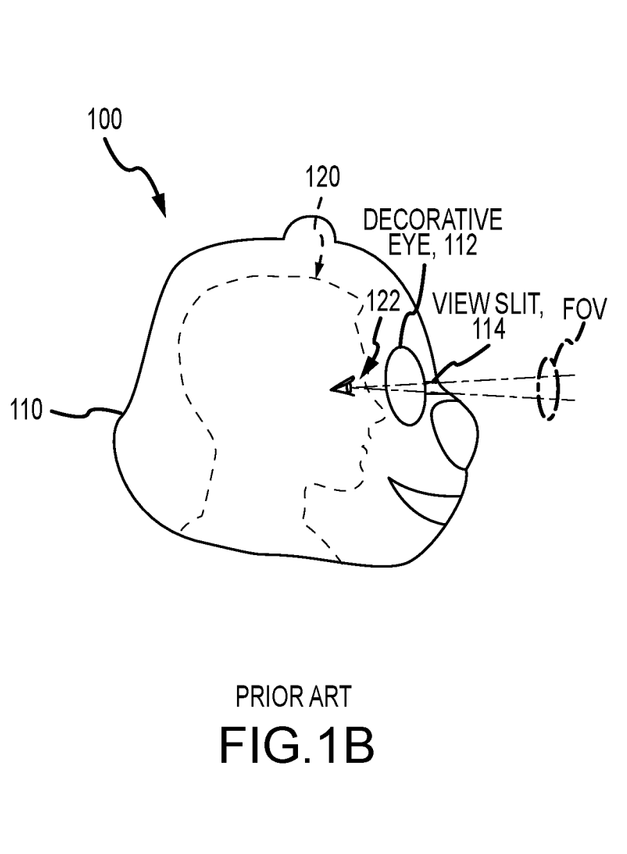

FIGS. 1A and 1B illustrate front and side views, respectively, of a performer 120 wearing a conventional costume head 100. In this example, the costume head 100 includes a spherical outer shell 110 with a pair of decorative eyes 112 between which extends a slit opening or view slit 114. The human performer 120 places the outer shell 110 over their head such that their eyes 122 are facing the front of the head 100. However, the costume eyes 112 are merely decorative and are spaced so far apart that they do not align with a spacing between the human performer's eyes 122. The height of the human performer's eyes 122 do align, though, with a view slit 114 provided between the decorative eyes 112 such that the performer 120 can view the outside space through the view slit 114. Unfortunately, the view slit 114 is relatively narrow and the human performer's eyes 122 are spaced a distance away from the slit 114 in the shell 110 such that they are provided a relatively limited view (e.g., a small or narrow field of view (fov)), which can hinder their interaction with people nearby including making it difficult to keep proper eye contact and to correctly direct the gaze of the costume head 100. In some cases, the slit 114 is also covered by fabric or the like to limit observers from seeing inside the costume head 110, and this further limits what a performer 120 can see through the slit 114

Figure 2:
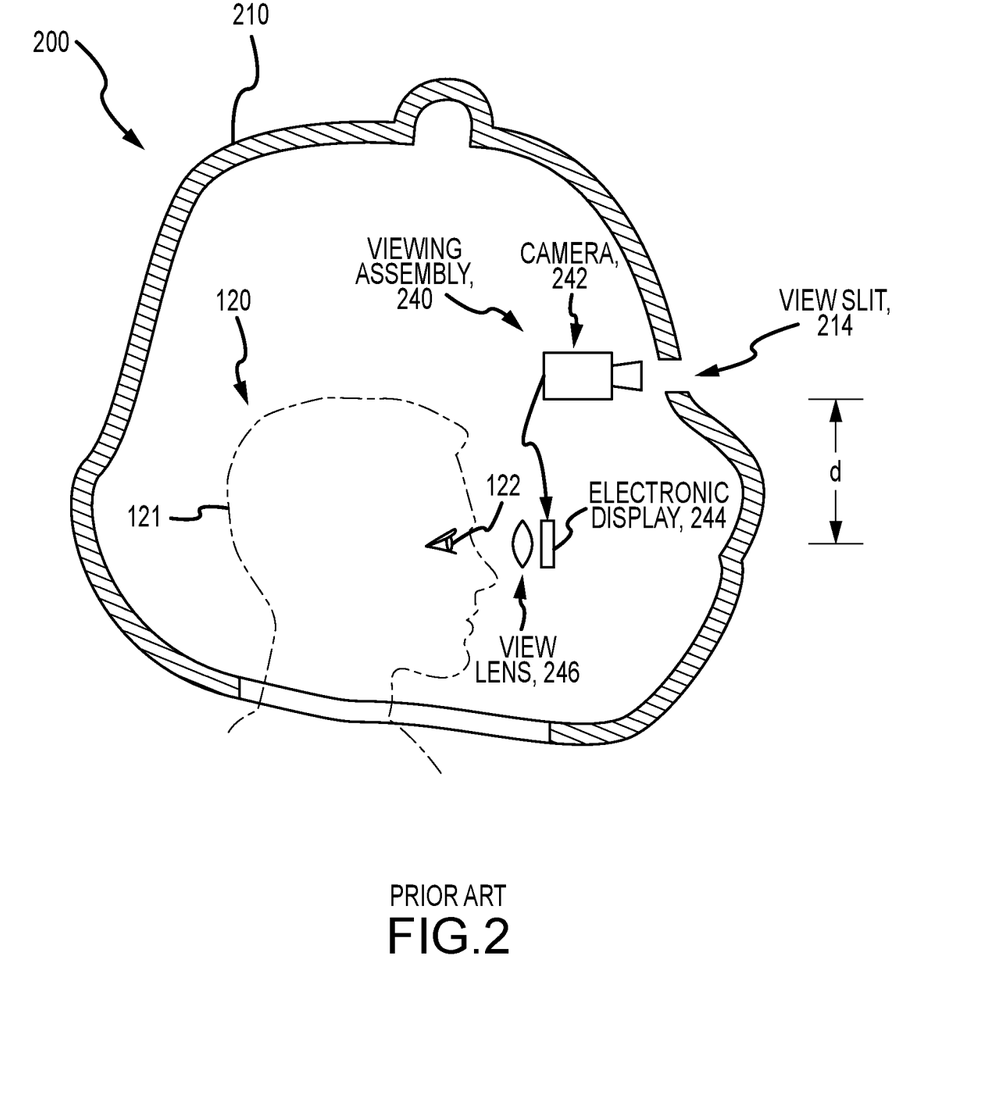
FIG. 2 illustrates a schematic sectional view of a costume head with a camera-based viewing assembly as implemented in prior walk around costumes.

In some costume heads, the human performer/wearer's eyes are vertically offset some distance below the eyes and/or any viewing ports or openings, which makes it impractical for the performer to view the outside world directly through such openings in the costume head. FIG. 2 illustrates one conventional solution with costume head 200 that is shown with a schematic cross section to include an outer shell 210 with a view slit 214. When the head 200 is worn by a performer 120, their head 121 extends through a neck opening so that their eyes 122 are vertically offset or below the view slit 214 by a distance, d, that may be a few inches or more in some cases.

To provide a view to the space outside the outer shell 210, the costume head 200 is fit with a viewing assembly 240 that includes a video camera 242 with its lens positioned at or near the view slit 214. The video captured by the camera 242 is fed to an electronic display (or head mounted display) 244 positioned below the slit 214 to be aligned with or in front of the performer's eye(s) 122, and a view lens 246 may be provided to enhance the output of the display 244 for the performer 120. Two near-eye displays 244 may be used present the view of the camera 242 to the costumed performer 120. The viewing assembly 240 is useful for providing the performer 120 with a good fov and line of sight of the outer space but has a number of limitations when it is implemented and put to heavy use. The camera 242 often will need repair including battery replacement, and the camera model often will be deprecated with replacement models becoming less capable and more expensive in some applications. Even with two displays 244 the viewed images are monoscopic, and, while walking or during head movements, camera latency causes conflicts between the viewed scene and the proprioception/vestibular systems, which often leads to dizziness of the performer 120 and reduced agility.

Hence, there remains a need for a new viewfinder for costume heads to redirect the costumed performer's line of sight so that they can wear appropriately proportioned costumes and may look out of the costume head, navigate the world, and interact with nearby people. Preferably, the new view finder would be non-electronic to avoid the need for batteries, wiring, ongoing maintenance and repair, camera latencies, and the possibility of equipment becoming deprecated.

SUMMARY

In brief, an optical viewfinder is provided for use in walk-around characters and other costumes. The optical viewfinder is configured for placement in a spherical or other shaped structural shell of a costume head to be between a view portal (e.g., any opening in the shell of the head such as a slit between spaced apart eyes, character eyes not aligned with the wearer or positioned an undesirable distance from the wearer's eye locations, and so on) and the costume wearer's eyes. The optical viewfinder is configured to effectively move the wearer's eye to the view slit or portal to achieve a wider field of view (fov).

For example, the view slit may be vertically offset (e.g., above) the location of the costume wearer's or performer's eyes, and it may be useful for the optical viewfinder to function as a periscope while addressing issues with image flipping. This can be handled in a number of ways in the optical viewfinder such as: (a) adding a relay to a periscope-type configuration (so have two relays) to "flip the flip"; (b) use a roof pentaprism or pentamirror to provide correct flip; and (c) include an optical loop with mirrors or the like.

In general, the optical viewfinder may be configured to provide a larger eye box (where person's eye can see all views) in the costume head because an incoming lens and/or aperture image may be copied into the head but only provides quality images at one eye location (e.g., performer cannot move their eyes about). When using optical relays, the optical viewfinder may provide one relay per eye to achieve stereo and/or obtain better focal depth. However, the inventor recognized that it can be challenging to increase the size of the eye box and increase fov with reasonably sized optics, as there is often only a limited amount of space inside a costume head. One solution provided by the new optical viewfinder is the use of a screen to image the outside world onto, thereby displaying the image a small distance in front of the performer's eye(s), which is then viewed by an eyepiece to make the image appear at infinity (or a larger distance) again. The screen may be a diffuser that acts to scatter light to spread the light so that it looks like it came from a larger aperture (not just a copy of the incoming light from the view slit/portal). Use of a screen (or one screen per eye) can result in some loss of depth and/or some loss of brightness. To address this issue, a field lens may be provided in the optical viewfinder to redirect some edge light to add back brightness and to manage the size of the eye box.

With regard to achieving an enlarged fov, the optical viewfinder of the costume head can include a special eyepiece. For example, a fisheye lens may be used to deliver the image to the performer's eye, and, in some cases, a second fisheye lens may be provided as the incoming or near-aperture lens to enhance fov. The fisheye lens or lenses may be 1-to-1 lenses or configured to provide magnification to enlarge the image provided to the person wearing the costume head. In some embodiments, the fisheye or other lenses (such as an aperture or incoming light lens) may be shifted to move the fov such as by directing the incoming light/image lens downward to allow the performer to more easily see the ground around them and to see objects and people that are below eye level such as nearby children to enhance desired interaction between the costumed character and nearby observers.

More particularly, a costume head is provided that is adapted for enhanced visibility. The costume head includes an outer shell defining an interior space for receiving a head of a human performer. The outer shell includes an aperture allowing incoming light from an exterior space outside the outer shell to enter the interior space, and an eye location for the human performer is spaced apart from the aperture when the head is received in the interior space. To provide an enlarged field of view (fov), the costume head is fitted with an optical viewfinder assembly disposed within the interior space of the outer shell between the aperture and the eye location. The optical viewfinder assembly is adapted for receiving the incoming light and transmitting the incoming light to the eye location to move a viewpoint of the human performer to or proximate to the aperture, whereby the human performer is provided a larger field of view of the exterior space.

In some embodiments of the costume head, the eye location is coplanar with a center axis of the aperture, e.g., in use of the head the eye of the performer is only offset in depth. In such cases, the optical viewfinder assembly may be provided as a non-inverting optical relay. Particularly, the non-inverting optical relay may include an objective lens positioned adjacent an outlet of the aperture into the interior space and further may include a field lens spaced apart from the objective lens providing a flip of an image output by the objective lens. In other cases, though, the non-inverting optical relay may include an inverting prism proximate to an outlet of the aperture into the interior space for receiving the incoming light, and the relay may further include, between the eye location and the inverting prism, a pair of spaced apart lenses with a screen positioned between the pair of spaced apart lenses for displaying a non-inverted image to the eye location, whereby an eye box of the human performer is increased in size.

In other embodiments of the costume head, the eye location is offset both a vertical distance and a horizontal distance from an outlet of the aperture into the interior space. In such cases, the optical viewfinder assembly may take the form of a non-inverting optical periscope configured to move the viewpoint upward and forward to the outlet of the aperture. In some implementations, the non-inverting optical periscope may include an objective lens proximate to the outlet of the aperture for receiving the incoming light, an eyepiece proximate to the eye location adapted to re-collimate the incoming light, and an optical relay between the objective lens and the eyepiece directing the incoming light output by the objective lens downward into the interior space to a horizontal plane coplanar with the eye location. Further, in such implementations, the optical relay may include a screen (e.g., a diffuser element) receiving the incoming light output from the objective lens and displaying an image, whereby an eye box of the human performer is increased in size. Still further, the objective lens and the eyepiece may each be provided as a fisheye lens, whereby the field of view is further increased in size.

DETAILED DESCRIPTION

Briefly, an optical viewfinder assembly or system (or "optical viewfinder") is described that is particularly well suited for use in a head of a walk around or character costume. It can be positioned between a view slit or aperture (e.g., any opening in an otherwise opaque shell or head structure of a costume) and an expected position of an eye or eyes of a person wearing the costume (e.g., a wearer or a performer). The optical viewfinder is used to view an upright image of the view taken at (and through) the costume head's eyes or view slit.

In one useful embodiment, the optical viewfinder may include a lens that is located at the costume's view slit, and the view of the outside world from the perspective of this incoming (or aperture or objective) lens is redirected 90 degrees (and flipped) in some cases by a roof pentaprism to form an upright image onto a diffusing screen. The viewer or performer looks at the image on the screen after it is bounced off a 45-degree mirror and through an eyepiece (or output lens). The eyepiece is configured to place the image at "infinity" and allows comfortable viewing of the diffusing screen close to the eye of the viewer. The 45-degree mirror makes the viewpoints of the eye and the aperture or objective lens in the same direction, just offset a distance vertically (e.g., a vertical offset distance from the aperture/eye slit and the location of the wearer's eyes). The viewer/wearer sees a 1:1 upright image of the outside world (or one that is magnified if desired by changing the ratio of the objective and eyepiece lenses) from the offset viewpoint at the costume head's eyes or view slit. Two systems, one for each eye, may be used to provide stereoscopic viewing so the viewer can see the world outside the costume head in 3D.

Figure 3:
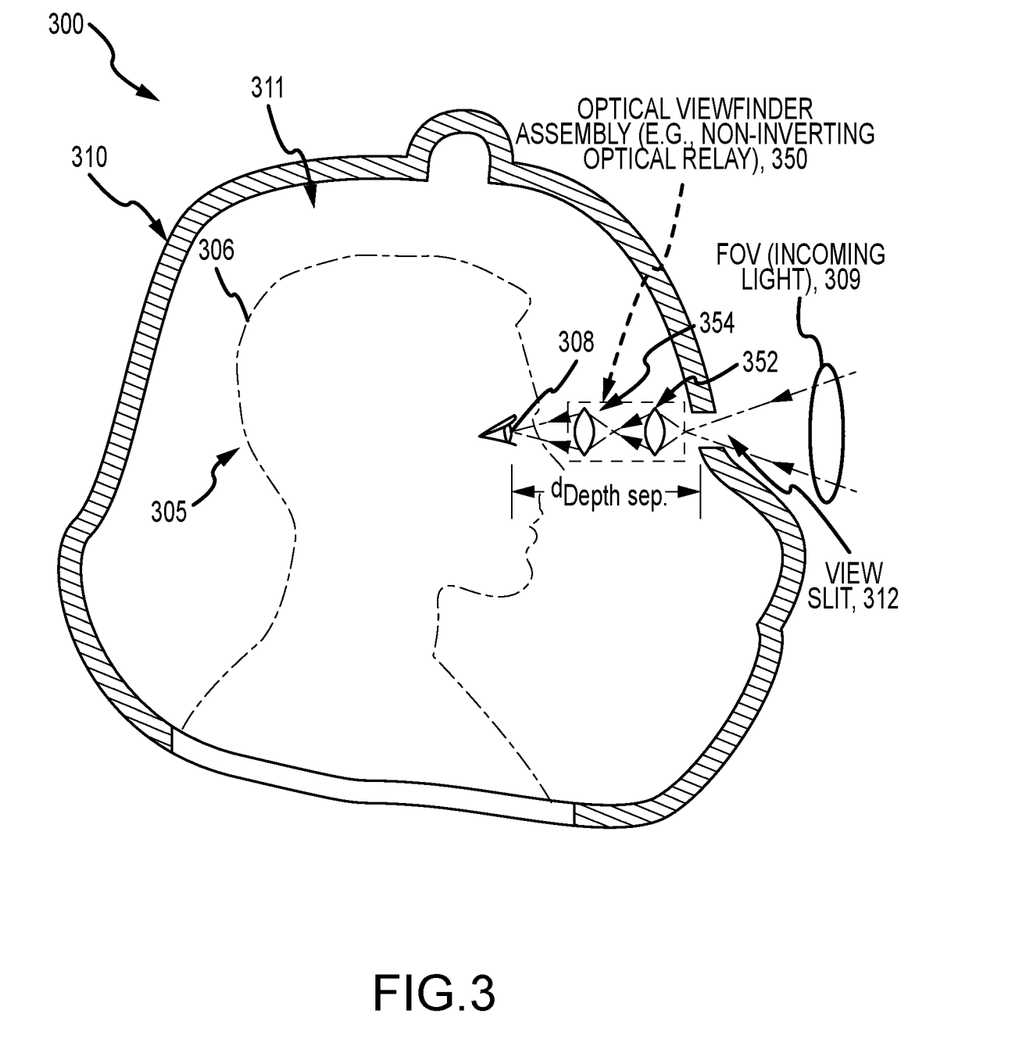
FIG. 3 is a side sectional view illustrating schematically a costume head including a first embodiment of an optical viewfinder assembly of the present description.

FIG. 3 is a side sectional view illustrating schematically a costume head 300 including a first embodiment of an optical viewfinder assembly 350 of the present description. The costume head 300 includes an outer or structural shell or helmet 310 defining in interior space 311 for receiving the head 306 of a human performer/actor 305 (or wearer of a costume including the head 300). The costume's shell 310 (which is spherical in this non-limiting example) includes an aperture or view slit 312, which allows light 309 from the space outside head 300 to enter the interior space 311 of the shell 310. In this example, the performer's head 306 is positioned within the interior space 311 such that their eyes 308 are vertically aligned with the view slit 312 but, due to the large size of the head's shell 310 the view slit 312 is separated a relatively large distance, $d_{Depth\ Sep.}$, in depth from the view slit 312 (e.g., one to several inches or more separation is common in costume heads).

In this implementation, the optical viewfinder assembly 350 is disposed or positioned between the view slit 312 and the expected location of the viewer's eyes 308 when they are wearing the head 300. In typical use, the slit 312, the assembly 350, and the eye's 308 are aligned or generally coplanar. The optical viewfinder assembly 350 is configured to function to move the viewpoint of the eye or eyes 308 to the location of the view slit 312 (or its outlet into the space 311) or to eliminate the depth separation distance, $d_{Depth\ Sep.}$, to provide a larger field of view with incoming light 309. To this end, the assembly 350 may include components to form a non-inverting optical relay.

In one embodiment as shown in FIG. 3, the assembly 350 includes a first or aperture lens 352 positioned at or proximate (e.g., within 1 inch) of the view slit 312 (or its outlet into the space 311) and a second lens 354 proximate (e.g., within 3 inches) to the eye or eyes 308 of the performer 305. The lenses 352, 354 are arranged to be aligned or to be coaxial and function, in part, to provide focus so that the eye 308 perceives the light 309 as if at the aperture/view slit 312. Further, the lenses 352, 354, which may be an objective lens and a field or eye piece lens, respectively, act to "flip-the-flip" (or to flip the flip provided by the first lens 352) so that the view provided to the eyes 308 of the performer 305 is not inverted (i.e., so the assembly 350 is a non-inverting optical relay). A separate set of these components may be provided in the assembly 350 to provide light concurrently to both eyes 308 of the performer 305 for stereoscopic viewing of the surrounding environment.

Figure 4:
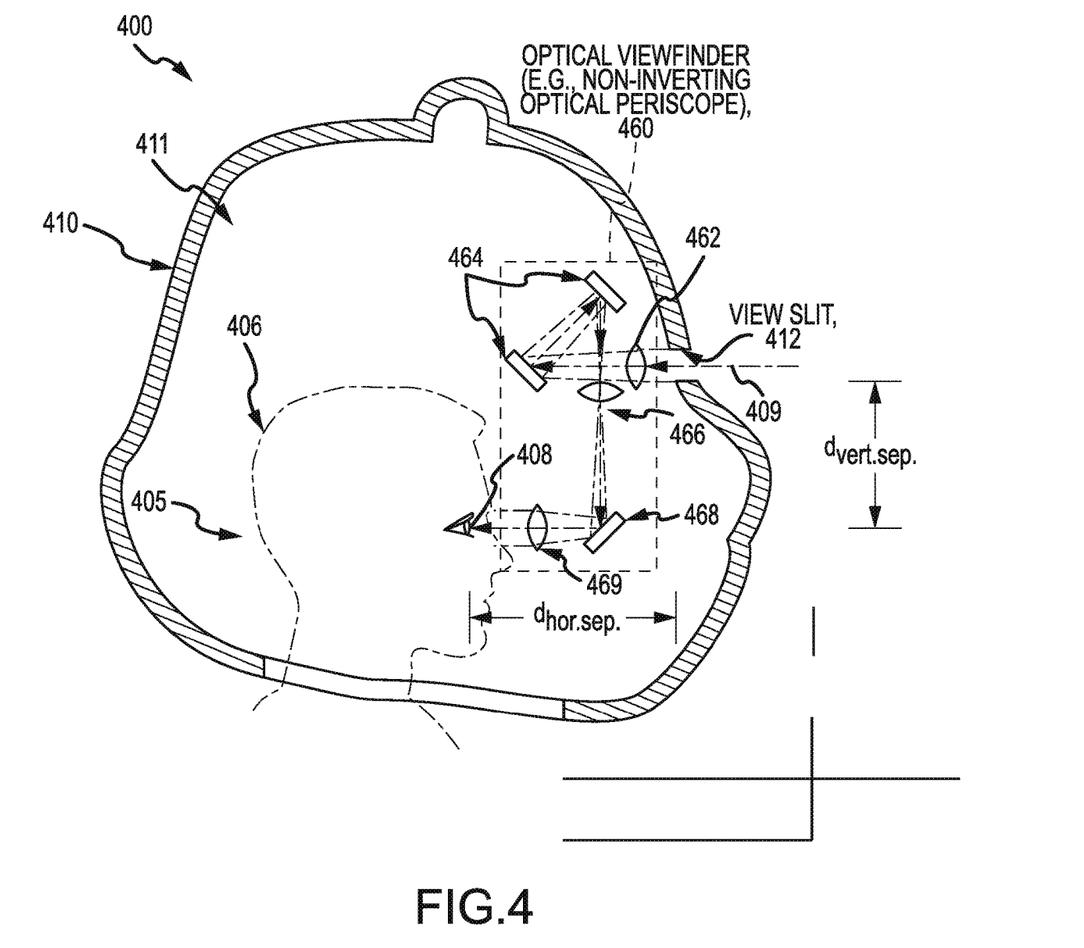
FIG. 4 is a side sectional view, similar to FIG. 3, illustrating schematically a costume head including a second embodiment of an optical viewfinder assembly of the present description.

FIG. 4 is a side sectional view, similar to that of FIG. 3, illustrating schematically a costume head 400 including a second embodiment of an optical viewfinder assembly 460 of the present description. The costume head 400 again includes an outer or structural shell or helmet 410 defining in interior space 411 for receiving the head 406 of a human performer/actor 405 (or wearer of a costume including the head 400). The head shell 410 (which is spherical in this non-limiting example) includes an aperture or view slit 412, which allows light 409 from the space outside head 400 to enter the interior space 411 of the shell 410. In this example, the performer's head 406 is positioned within the interior space 411 such that their eyes 408 are vertically offset a distance, $d_{Vert.\ Sep.}$, from the view slit 412 (or from a horizontal plane extending through the center of the slit 412 or from the bottom/lower edge of the slit 412). Further, as was the case for head 300 of FIG. 3, due to the large size of the head's shell 410, the view slit 412 is separated a relatively large distance, $D_{Depth.Sep.}$, in depth from the view slit 412 (e.g., one to several inches or more separation is common in costume heads).

In this implementation, the optical viewfinder assembly 460 is disposed or positioned between the view slit 412 and the expected location of the viewer's eyes 408 when they are wearing the head 400. The optical viewfinder assembly 460 is configured to function to move the viewpoint of the eye or eyes 408 to the location of the view slit 412 (or its outlet from the space 411) or up and forward to the view slit 412 (i.e., to eliminate or reduce the depth separation distance, $d_{Depth\ Sep.}$, and the vertical separation distance, $d_{Vert.\ Sep.}$, to provide a larger field of view with incoming light 409. To this end, the assembly 450 may include components to form a non-inverting optical periscope.

In one embodiment as shown in FIG. 4, the assembly 460 includes a first or aperture lens 462 positioned at or proximate (e.g., within 1 inch) of the view slit 412 (or its outlet into the space 411), and this may be provided as an objective lens. The assembly 460 further includes an optical relay that provides the flip of the image from the first/input lens 462, and, as shown, the relay may include a pair of spaced-apart 45-degree mirrors 464 (such as roof pentaprisms or pentamirrors), a downstream field lens 466, and a third 45-degree mirror (such as a fold mirror or the like). The non-inverting optical periscope 460 may further include an eyepiece or output lens 469 receiving light from the relay and positioned proximate (e.g., within 3 inches) to the eye or eyes 308 of the performer 305, and the lens/eyepiece 469 may be configured or chosen to re-collimate the light 409 so that it is sensed by the eye 408 as being at infinity. A separate set of these components may be provided in the assembly 460 to provide light concurrently to both eyes 408 of the performer 405 for stereoscopic viewing of the surrounding environment.

Figure 5:
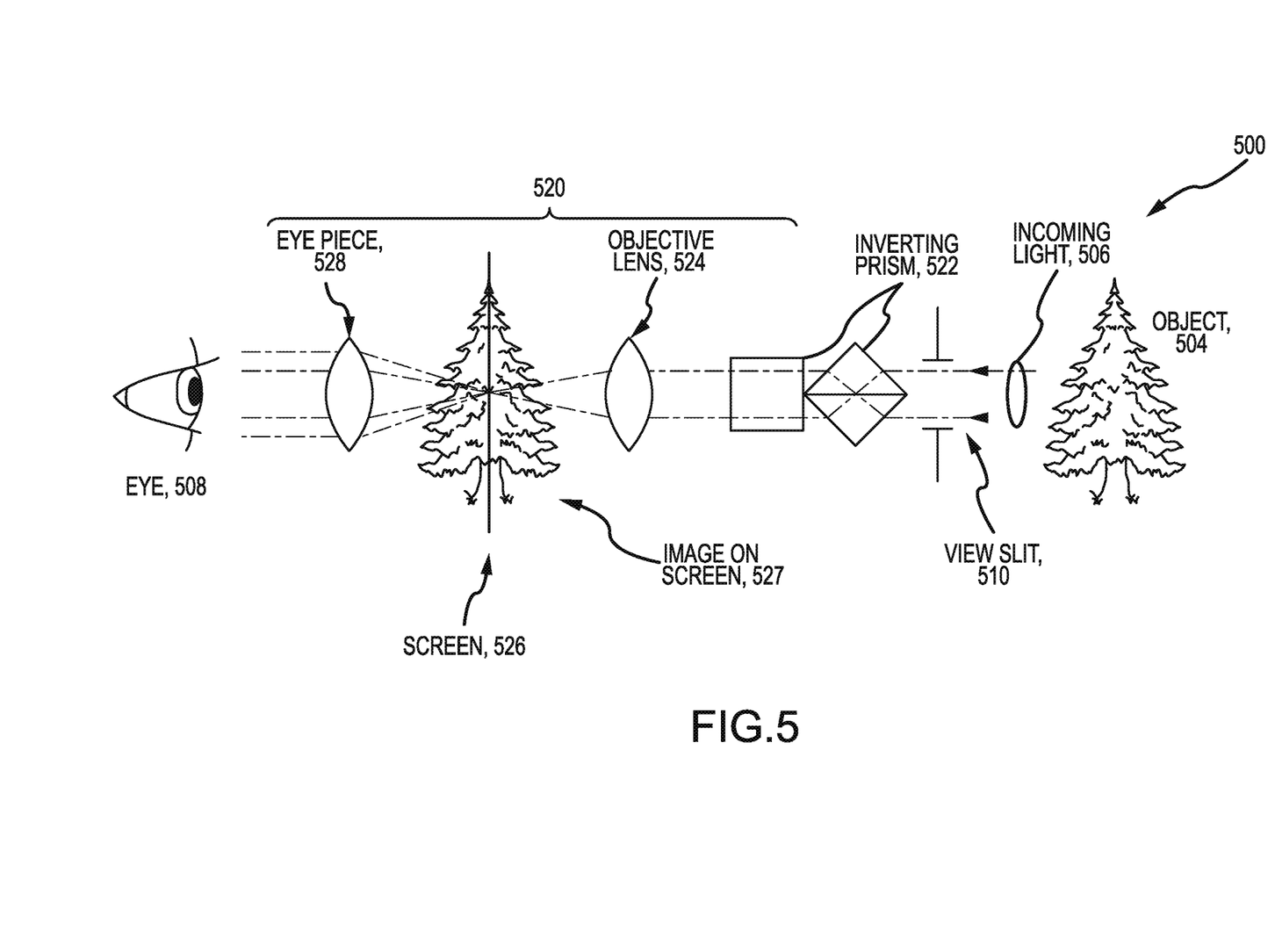
FIG. 5 is a schematic side view of a portion of a costume head with a third embodiment of an optical viewfinder assembly of the present description.

In some cases, it may be desirable to increase the size of the eye box provided to the performer inside the costume head. FIG. 5 is a schematic side view of a portion of a costume head 500 with a third embodiment of an optical viewfinder assembly 520 of the present description, which may be used in place of the assembly 350 of FIG. 3. Particularly, the assembly 520 may be disposed or positioned within a shell of the costume head 500 so as to be between a view slit/aperture 510 in the head's shell and an expected location of a performer's eye 508 (when they are wearing the head 500), and, as discussed with reference to FIG. 3, this eye location is vertically aligned with the view slit 510 but offset in depth some distance so that it is desirable to move the view point to coincide with the location of the slit 510. Further, though, the optical viewfinder 520 may be configured to increase the size of the eye box in which the eye 508 is to be positioned during use of the costume head 500.

To achieve these two functional goals, the assembly 520 includes an inverting prism 522 positioned at or proximate to the outlet of the view slit/aperture 510 to receive incoming light 506 such as light reflected off an object 504 in the surrounding space (space outside the head 500). Downstream of the inverting prism 522 (e.g., a Pechan-Schmidt or Dove prism), an objective lens 524 is provided that flips the image and focuses the light from the prism 522 onto a screen 526 (e.g., a diffusing screen element such as a field lens with ground glass on an image or focal plane, a transparent OLED to allow presentation of augmenting data/information and/or images to the performer, and the like). An image 527 is displayed upon or visible by the eye 508 on the screen 526 (which may be 1 to 3 inches or more from the eye 508), and the screen 526 is useful for increasing the size of the eye box containing the eye 508. An eyepiece or output lens 528 is provided between the screen 526 and the location of the eye 508 to re-collimate the light 506 from the screen 526 so that the screen image 527 appears at infinity. One screen 526 may be used for both eyes 508 or the optical components of the assembly 520 may be duplicated to provide stereoscopic viewing.

Figure 6:
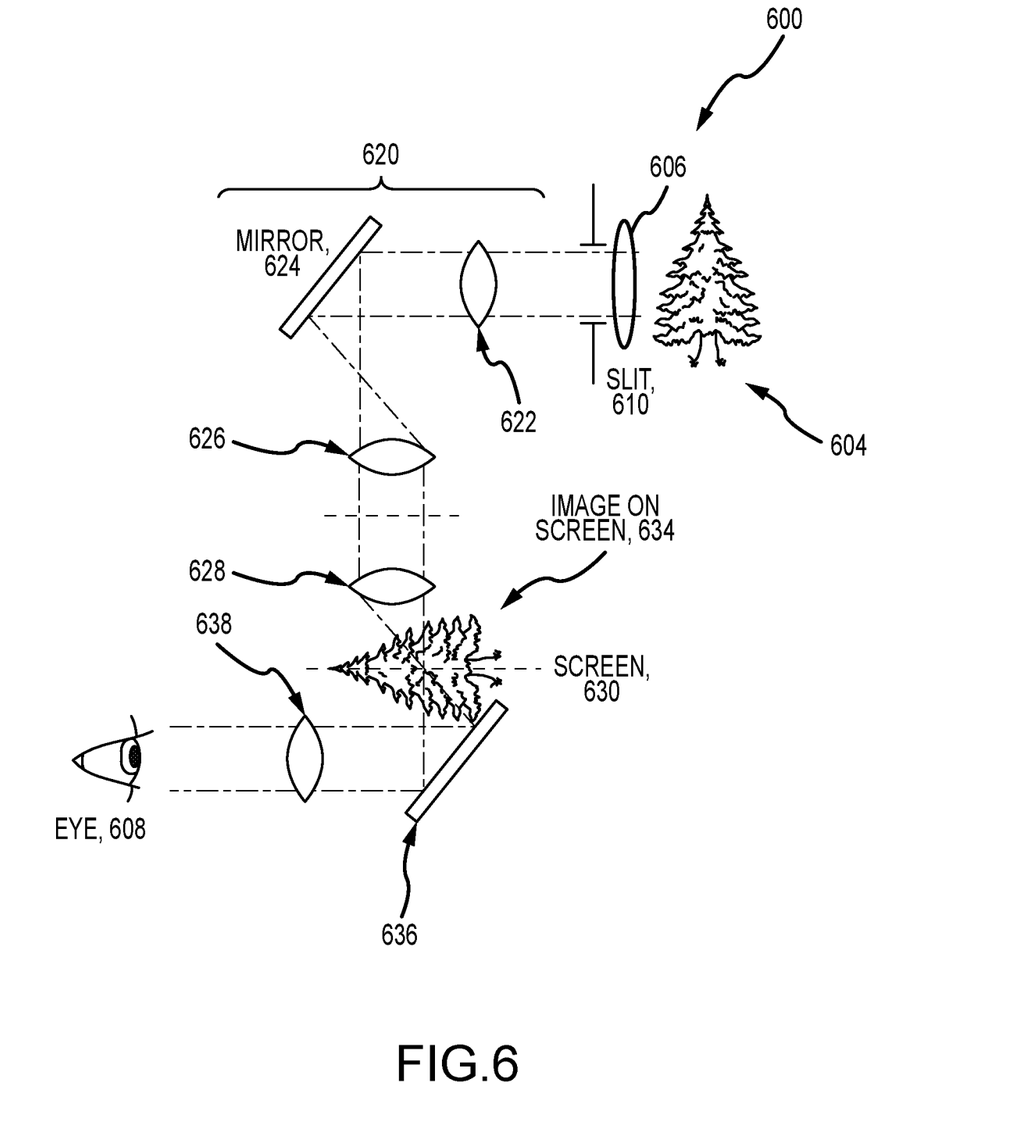
FIG. 6 is a schematic side view of a portion of a costume head with a fourth embodiment of an optical viewfinder assembly of the present description.

FIG. 6 is a schematic side view of a portion of a costume head 600 with a fourth embodiment of an optical viewfinder assembly 620 of the present description, which may be used in place of the assembly 460 of FIG. 4. The assembly 620 may be disposed or positioned within a shell of the costume head 600 so as to be between a view slit/aperture 610 in the head's shell and an expected location of a performer's eye 608 (when they are wearing the head 600), and, as discussed with reference to FIG. 4, this eye location is vertically offset some distance with the view slit 610 and offset in depth some distance so that it is desirable to move the view point forward and upward to coincide with the location of the slit 610. Further, the optical viewfinder 620 is configured to increase the size of the eye box in which the eye 608 is positioned during use of the costume head 600.

To achieve these functional goals, the assembly or periscopic viewfinder 620 includes a first or aperture lens 622 (e.g., an objective lens) positioned at or proximate to the outlet of the view slit/aperture 610 that initially receives the incoming light 606 that passes through the slit 610 (e.g., light reflected off of the surfaces of an object 604 in the space about the costume head 600). The lens 622 focuses the light onto a first 45-degree mirror 624 (e.g., a pentaprism or pentamirror), which directs the light downward into the interior head space (e.g., toward the lower vertical position of the eye 608). The reflected light passes through a pair of spaced apart lenses 626 and 628 to provide proper image orientation and that act to focus the light onto a screen 630 so as to display/create an image 634 on the screen 630 of the object 604. Light associated with the displayed image 634 is then reflected off a second 45-degree mirror 636 to pass through a fourth or output lens 638 proximate (e.g., 1 to 3 inches from) the performer's eye 608. The lens 638 acts to re-collimate the light so the image 634 is perceived by the performer as being at infinity.

Figure 7:
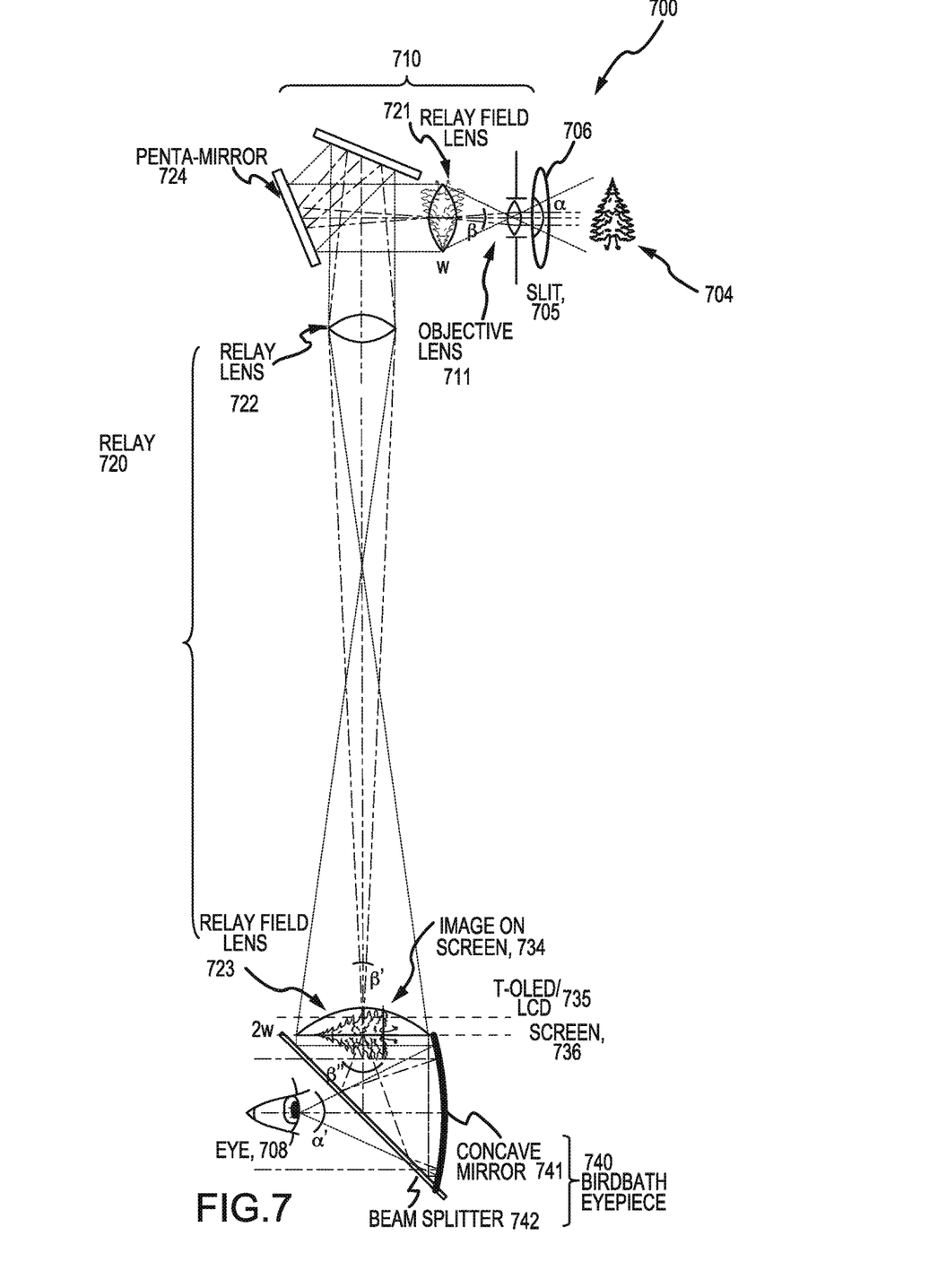
FIG. 7 is a schematic side view of a portion of a costume head with a fifth embodiment of an optical viewfinder assembly according to the present description.

In some periscope implementations (e.g., when the eye is vertically offset from the aperture), it is desirable to increase the field of view (fov) without the need for or use of larger optics (or optics taking up more space in the costume head). In this regard, FIG. 7 is a schematic side view of a portion of a costume head 700 with a fifth embodiment of an optical viewfinder assembly 710 of the present description, which may be used in place of the assembly 460 of FIG. 4 or assembly 620 of FIG. 6. The assembly 710 may be disposed or positioned within a shell of the costume head 700 so as to be between a view slit/aperture 705 in the head's shell and an expected location of a performer's eye 708 (when they are wearing the head 700), and, as discussed with reference to FIGS. 4 and 6, this eye location is vertically offset some distance with the view slit 705 and offset in depth some distance so that it is desirable to move the view point forward and upward to coincide with the location of the slit 705. Further, the optical viewfinder 710 is configured to increase the fov without larger optics.

To achieve these functional goals, the assembly or periscopic viewfinder 710 includes a first or aperture lens 711 (e.g., an objective lens) and a relay 720 including lenses 721, 722, and 723, an inverting fold-mirror (penta-mirror or the like) 724, a scattering screen 736, and a mirror eyepiece 740 including a beam-splitter 742 and a concave mirror 741. The first objective lens 711 is positioned at or proximate to the outlet of the view slit/aperture 705 that initially receives the incoming light 706 that passes through the slit 705 (e.g., light from the space outside the head 700). The lens 711 focuses the light, from a field of view angle, $\alpha$, forming an image of the outside scene of width, w, onto an optical relay 721, 722, and 723 that directs the light downward into the costume head toward the vertical location of the eye 708, and the optical relay 720 may take the form of lenses 721, 722, and 723 with a fold mirror (e.g., a pent-prism) 724 positioned therebetween.

The optical relay 720 directs the light from the objective lens 711 onto a screen 736 so as to display/create an enlarged image on the screen 736 (e.g., up to a size 2 w or larger). Additional optional modulators, such as an emissive transparent OLED or an absorbing liquid crystal display (LCD) 735 may be collocated at the screen 736 to provide augmented imagery or to provide occlusion effects. Each point on the screen 736 is scattered through an angle, $\beta'$, which is larger than the initial beam angle, $\beta$, focused by objective lens 711 through its small aperture. The scattering from screen 736 makes each point on screen appear as if it was collected from a larger aperture or objective lens (although with less light intensity).

Light associated with any displayed image is then reflected off another 45-degree beamsplitter 742, and it is collimated by concave mirror 741 so that it passes through the beamsplitter 742 to the viewer's eye 708. The combination of beamsplitter 742 and concave mirror 741 form a reflective eyepiece, also known as bird-bath objective. The beamsplitter 742 may be provided with a polarization selective mirror and a ¼-wave retarder so that polarized light may efficiently pass through the system without light loss associated with a 50/50 beamsplitter. An off-axis parabolic reflector or a refractive lens could also be used as the eyepiece. Reflective mirrors may have smaller focal length to aperture size ratios than refractive lenses and do not suffer from chromatic aberrations.

The light from the small aperture but short focal length objective 711 forms a small image of width, w, and small divergence, $\beta$, but with a large field of view, $\alpha$. The small width, w, and small divergence, $\beta$, allows smaller size optics to relay the image to the screen 736. The relay also enlarges the image at screen 736 to a larger width (e.g., 2 w) but with even smaller divergence, β'. However, the screen scatters the light from each point increasing the divergence to β". The eyepiece optics 740 accepts the light from the screen 736 and collimates the light for the eye 708. The reflective eyepiece optics 740 also folds the light 90 degrees and provides a desirable image flip to provide an upright image to the viewer.

The field of view, α', provided to the eye 708 by the eyepiece optics 740 is related to the image width (e.g., 2 w) on the screen 736 (or aperture of the eyepiece) and the focal length of the eyepiece optics 740. The eyebox (or the region where the eye 708 may see a complete image) is governed by the aperture, focal length, and divergence. The focal length to aperture ratio (f/#) may be chosen for the eyepiece 740 to be equal to that of the objective lens 711 so the field of view, α', provided to the viewer is the same as the field of view, α', at the slit 705. Since the image at the screen 736 formed by the relay 720 (and accepted by the eyepiece 740) is larger than the image formed by the objective 711, the focal length of the eyepiece 740 should be proportionally longer so the eyepiece and objective have the same focal length to aperture ratio (f/#) and field of view.

The reflective eyepiece 740 has a proportionally much larger aperture than the objective 711 to accept the larger divergence, β", from the scattering screen 736. Hence, the eyepiece 740 provides a larger eyebox than would be possible without the scattering screen 736. The eyepiece 740, which is positioned proximate to (e.g., 1 to 3 inches from) the performer's eye 708. The eyepiece lens 740 collimates a wide screen image with a large divergence, which allows the viewer to see a natural wide field of view image in a large eyebox through a compact system.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, one or more of the optical viewfinders of FIGS. 3-7 may be implemented using fold mirrors with optical power (e.g., like a concave mirror or an off-axis parabolic mirror) in place of separate lenses and/or fold mirrors. This would reduce weight and may also reduce chromatic aberrations associated with lenses. As one specific exemplary implementation, the system 400 of FIG. 4 may be modified by combining the lens 462 and one of the fold mirrors 464 into a single tilted concave mirror or an off-axis parabolic mirror. A similar modification may be provided to replace or implement the mirror 468 and the eyepiece 469 in FIG. 4.

The optical viewfinder of FIGS. 3-7 is all optical, and the world view through the optics has no latency or other video-related defects (e.g., blooming, saturation, and the like) associated with video see-through camera-based displays. Without electronics, the all-optical viewfinder is robust and future proof. The designed system also has no total optical power so there is no magnification, with a 1:1 image, allowing proper judgment of size and distance (except for the vertical offset from the periscope). The costumed performer can naturally see 3D to judge distances allowing them to comfortably and confidently walk around in and interact with the real world environment. Lack of magnification and the viewing of the scene on a diffusing screen also prevents light sources from being concentrated into the eye.

I claim:

1. A costume head, comprising:
   an outer shell defining an interior space configured to receive a head of a human performer, wherein the outer shell includes an aperture allowing incoming light from an exterior space outside the outer shell to enter the interior space, wherein the incoming light forms an image of at least a portion of the exterior space, and an eye location for the human performer is spaced apart from the aperture when the head is received in the interior space; and
   a non-electronic optical viewfinder assembly comprising a collimating lens disposed adjacent to the eye location, wherein the image is transmitted a vertical distance and a depth distance from the aperture to the eye location.

2. The costume head of claim 1, wherein the non-electronic optical viewfinder assembly further periscope comprises an objective lens configured to receive the incoming light.

3. The costume head of claim 2, wherein the objective lens and the collimating lens each comprises a fisheye lens.

4. The costume head of claim 2, wherein the non-electronic optical viewfinder assembly further comprises a field lens spaced apart from the objective lens and configured to flip the image outputted by the objective lens.

5. The costume head of claim 2, wherein the non-electronic optical viewfinder assembly further comprises an optical relay between the objective lens and the collimating lens configured to direct the incoming light output by the objective lens downward into the interior space to a horizontal plane coplanar with the eye location.

6. The costume head of claim 5, wherein the optical relay comprises a diffuser configured to receive the incoming light output from the objective lens and display the image.

7. A costume head, comprising:
   an outer shell with an interior space configured to receive a head of a human performer so as to position an eye of the human performer at an eye location, wherein the outer shell includes an aperture defining a path for incoming light between the interior space and an exterior space outside the outer shell, wherein the incoming light forms an image of at least a portion of the exterior space, and the eye location for the human performer is spaced apart both a horizontal distance and a vertical distance from the aperture when the head is received in the interior space; and
   an optical viewfinder assembly comprising a collimating lens disposed adjacent to the eye location, wherein the image is transmitted the vertical distance and the horizontal distance to the eye location, without interruption.

8. The costume head of claim 7, wherein the optical viewfinder assembly further comprises an objective lens configured to receive the incoming light.

9. The costume head of claim 8, wherein the objective lens and the collimating lens each comprises a fisheye lens.

10. The costume head of claim 8, wherein the optical viewfinder assembly further comprises an optical relay between the objective lens and the collimating lens configured to direct the incoming light from the objective lens downward into the interior space to a horizontal plane coplanar with the eye location and the collimating lens so that the incoming light passes through the collimating lens eyepiece prior to reaching the eye location.

11. The costume head of claim 10, wherein the optical relay comprises a diffuser configured to receive the incoming light output from the objective lens and display the image.

12. A costume head, comprising:
 a shell with an interior space configured to receive a head of a performer, wherein the shell includes a view portal defining a path for incoming light from an exterior space into the interior space; and
 a non-electronic optical viewfinder comprising a collimating lens and disposed within the interior space of the shell, the non-electronic optical viewfinder configured to receive the incoming light and to direct the incoming light to an eye location of the performer, via the collimating lens disposed adjacent to the eye location, when the head of the performer is positioned in the interior space,
 wherein the incoming light is optically transformed to provide a viewpoint to the eye, and
 wherein the eye location is offset both a vertical distance and a horizontal distance from an outlet of the view portal into the interior space.

13. The costume head of claim 12, wherein the collimating lens is configured to collimate light to an infinite focus.

14. The costume head of claim 12, wherein the eye location is at least one inch from the view portal when the head of the performer is received in the shell.

15. The costume head of claim 12, wherein the non-electronic optical viewfinder further comprises a non-inverting optical periscope configured to transmit the incoming light the vertical distance and the horizontal distance to the eye location.

16. The costume head of claim 15, wherein the non-inverting optical periscope comprises an objective lens configured to receive the incoming light.

17. The costume head of claim 16, wherein the objective lens and the collimating lens each comprises a fisheye lens.

18. The costume head of claim 16, wherein the non-inverting optical periscope further comprises an optical relay between the objective lens and the collimating lens configured to direct the incoming light from the objective lens downward into the interior space to a horizontal plane coplanar with the eye location and the collimating lens so that the incoming light passes through the collimating lens prior to reaching the eye location.

19. The costume head of claim 18, wherein the optical relay comprises a diffuser configured to receive the incoming light output from the objective lens and display an image.

20. A wearable character head comprising:
 an outer shell defining an interior space configured to receive a human head therein, the outer shell defining a view aperture configured to receive light from an exterior of the outer shell into the interior space; and
 an optical viewfinder assembly configured to receive the light from the view aperture, the optical viewfinder assembly comprising:
  an objective lens positioned in the interior space proximate adjacent the view aperture and configured to output an image based on the light,
 a field lens spaced apart from the objective lens and configured to flip the image outputted by the objective lens, and
 a collimating lens disposed adjacent to an eye location of the human head received in the outer shell, wherein the optical viewfinder assembly is configured to transmit the image, without interruption, a vertical dimension and a depth dimension to the eye location within the interior space, wherein the eye location is different from the view aperture.

* * * * *